United States Patent [19]

Wiczer

[11] Patent Number: 4,505,165

[45] Date of Patent: Mar. 19, 1985

[54] TRACKBALL DEVICE

[75] Inventor: Max Wiczer, Skokie, Ill.

[73] Assignee: Wico Corporation, Niles, Ill.

[21] Appl. No.: 383,719

[22] Filed: Jun. 1, 1982

[51] Int. Cl.³ .................. G05G 9/00; G05G 13/00; F16H 13/00

[52] U.S. Cl. .................. 74/471 XY; 74/209; 384/245; 384/244; 384/246

[58] Field of Search ............ 74/209, 471 XY; 384/244, 245, 246, 440, 445, 428, 439

[56] References Cited

U.S. PATENT DOCUMENTS

| | | | |
|---|---|---|---|
| 566,178 | 8/1896 | Hutchinson, Jr. | 384/246 |
| 978,944 | 12/1910 | Seib | 384/244 |
| 1,346,400 | 7/1920 | Dover | 384/244 |
| 1,447,587 | 3/1923 | Calvert | 384/246 |
| 1,546,075 | 7/1925 | Horn | 384/244 |
| 2,127,196 | 8/1938 | Worley | 384/245 |
| 2,300,362 | 10/1942 | Shotter | 384/245 |
| 2,352,346 | 6/1944 | Schiffl | 384/245 |
| 2,544,587 | 3/1951 | Cloud | 74/209 |
| 2,587,677 | 3/1952 | Ammlung, Jr. | 384/244 |
| 3,389,608 | 6/1968 | Moskowitz | 384/246 |
| 3,643,148 | 2/1972 | Brown et al. | 74/471 XY |
| 3,987,685 | 10/1976 | Opocensky | 74/471 XY |
| 4,404,865 | 9/1983 | Kim | 74/471 XY |

*Primary Examiner*—Lawrence J. Staar
*Assistant Examiner*—Michael D. Bednarek
*Attorney, Agent, or Firm*—Emrich & Dithmar

[57] ABSTRACT

The trackball device includes two supports for the trackball, each of which has a code wheel associated therewith. The journals on the end of each shaft and the bearing surfaces of the pillow block associated with the shaft are constructed to have substantially point contact and thereby minimize friction.

1 Claim, 7 Drawing Figures

TRACKBALL DEVICE

BACKGROUND OF THE INVENTION

The present invention relates to a cursor position control means device of the type commonly referred to as a trackball device. Such devices are used, for example, to control the movement of a cursor of a video display, as in a video game.

Trackball devices include a housing having a circular opening therein and a plurality of rotatable supports, at least two of which are respectively rotatable about orthogonally related axes. A ball is loosely seated on the supports with a portion of the ball projecting through the opening, so that the user can manually rotate the ball. The rotatable supports respectively respond to corresponding components of rotational movement of the ball. The supports are respectively connected to signal generating devices which produce signals indicative of the speed and direction of rotation of the supports. The two orthogonally related supports respectively correspond to the X and Y directions of movement of the cursor, so that the speed and direction of movement of the cursor in the X and Y directions correspond respectively to the speed and direction of rotation of the associated supports.

In prior trackball devices, each support included a horizontal shaft journaled into roller bearings in turn carried by pillow blocks. Although these work reasonably well, the use of roller bearings undesirably adds cost to the trackball device. Also, even with such roller bearings, friction still was present.

SUMMARY OF THE INVENTION

It is, therefore, an important object of the present invention to provide an improved support for a trackball device which does not require the use of roller bearings and reduces friction.

In summary, there is provided in a trackball device, including a housing having a circular opening therein, a plurality of rotatable supports in the housing, and a ball seated on the supports with a portion of the ball projecting through the opening for mechanical rotation by a user, means associated with the support for generating control signals, the improvement being that each support includes a pair of spaced-apart pillow blocks and a shaft, each pillow block having a bearing surface, the shaft being carried by the associated pillow blocks, the shaft having journals at the ends thereof and respectively engaging the associated bearing surfaces, the configuration of the bearing surfaces and the journals being such as to cause each journal to make substantially point contact with the associated bearing surface.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings, a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
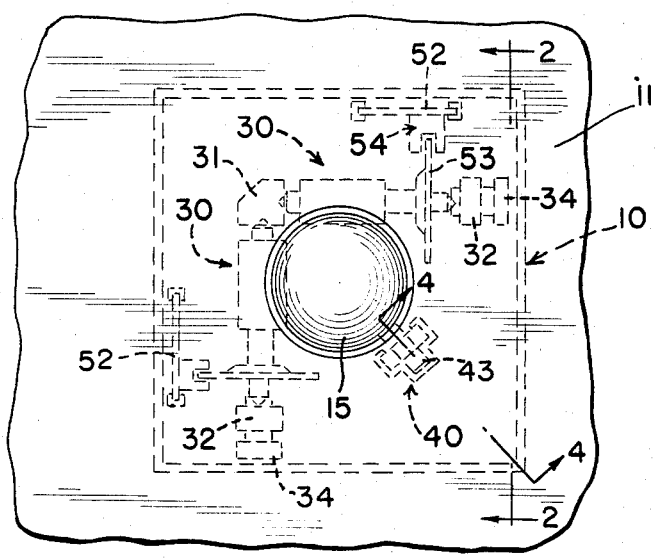
FIG. 1 is a top plan view of a table to which is mounted a trackball device shown in dotted line, which incorporates the features of the present invention.
Figure 2:
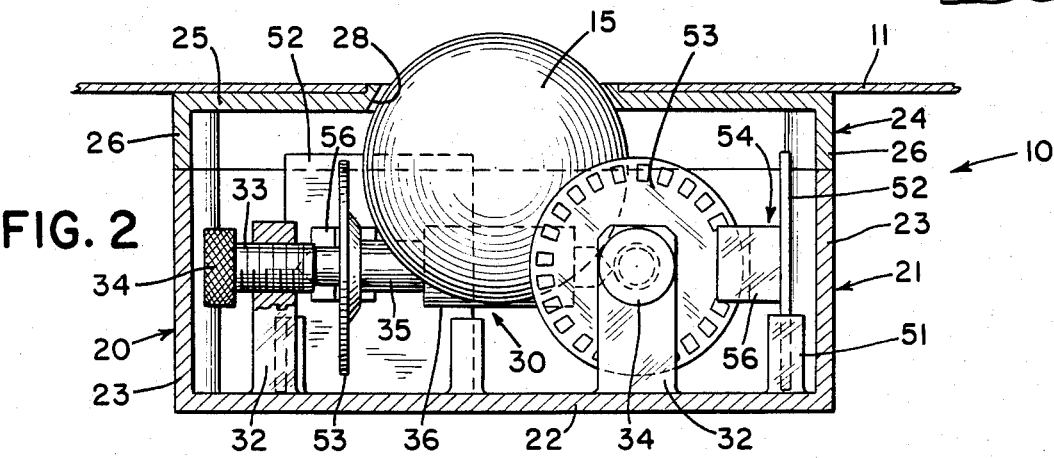
FIG. 2 is a view in vertical section on an enlarged scale taken along the line 2—2 of FIG. 1.
Figure 4:
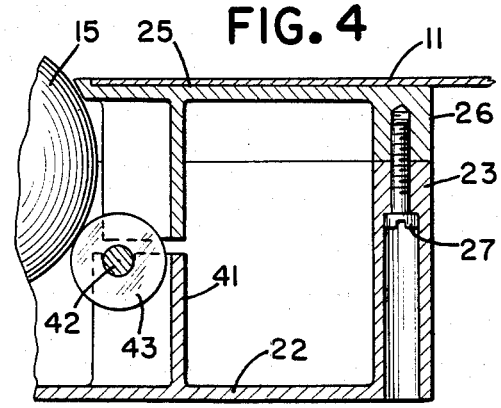
FIG. 4 is an enlarged view in vertical cross section taken along the line 4—4 of FIG. 1.

Referring now to FIGS. 1 and 2 of the drawings, there is illustrated a trackball device, generally designated by the numeral 10, mounted to the underside of a tabletop 11, which may be the top wall of a video game, for example. The trackball device 10 includes a housing 20 which includes a generally square base 21 having a bottom wall 22 and four side walls 23. The housing 20 also includes a generally square cover 24 having a top wall 25 and four side walls 26. The base 21 and cover 24 may be held together by screws 27 (FIG. 4). In the top wall 25 is an opening 28 through which the trackball 15 projects.

Figure 3:
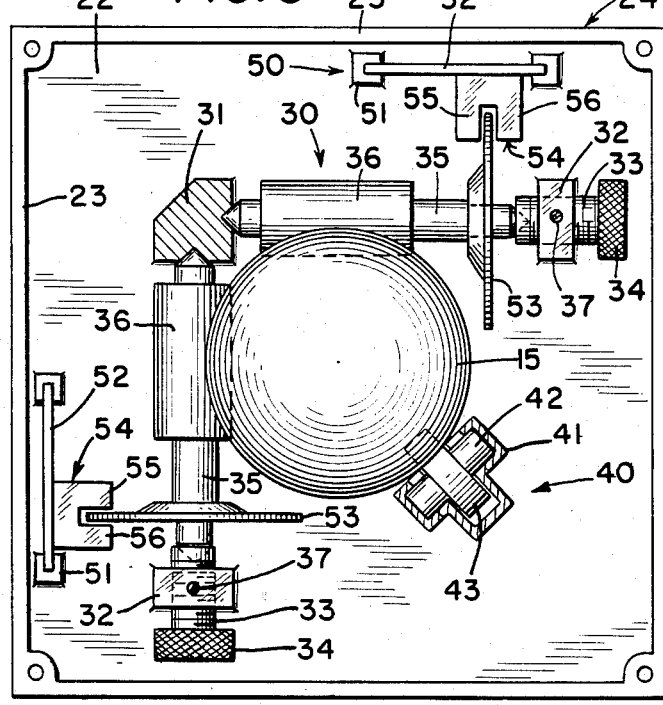
FIG. 3 is a plan view of the trackball device in FIG. 2 with the cover removed.

The ball 15 rests on two supports 30. Referring also to FIGS. 3 and 4, each support 30 includes a post 31 and a lug 32, both upstanding from the bottom wall 22 and preferably integral therewith. The lug 32 has a horizontally extending, threaded bore therethrough into which is threaded a stud 33 having a knurled head 34. Each support 30 also includes a generally horizontally arranged shaft 35 which in turn carries a ball engaging sleeve 36. A set screw 37 in the lug 32 can be loosened to enable axial adjustment of the stud 33 whereupon the set screw may be tightened to fix the position of the stud 33.

A third support 40 includes a pillow block 41 into which is journaled a short cylindrical shaft 42 carrying an idler wheel 43.

Each of the supports 30 is mechanically coupled to a control signal generator 50 which includes a pair of upstanding channels 51 into which is received the lower ends of an upstanding printed circuit board 52. Each of the circuit boards 52 has electrical components thereon being connected to an associated source of electrical power and control circuit (not shown). Each control signal generator 50 also includes a code wheel 53 which is a thin disc with a plurality of generally rectangular apertures therethrough equiangularly spaced therearound adjacent to the periphery thereof, in a well known manner. The code wheel 53 is dimensioned so that the apertured portion thereof projects into a U-shaped housing 54 having legs 55 and 56. The housing 54 carries a transducer of standard construction. Specifically, in the leg 55 is an LED light source and in the leg 56 is a photodetector. In operation, light from the LED passes through the apertures in the code wheel 53 to the photodetector to provide a series of pulse signals as the code wheel 53 rotates.

In use, the engagement sleeves 36 and the wheel 43 define a three-point support for the ball 15. The ball 15 is relatively heavy so that, in normal use, gravity maintains it firmly in engagement with the sleeves 36 and the wheel 43. The ball 15 is dimensioned so that a portion thereof projects through the opening 28. The protruding portion of the ball is accessible by the user for manual rotation thereof in the usual manner. The free seating of the ball permits rotation in any direction. Each of the sleeves 36 and the wheel 43 will, by frictional engagement with the ball 15, be rotated in response to a component of the rotational movement of the ball 15. The resulting rotation of the code wheels 53 produces control signals which control movement of a cursor or other element in an XY plane, the speed and direction of movement in the X or Y direction being proportional to the speed and direction of rotation of the corresponding one of the sleeves 36.

Figure 5:
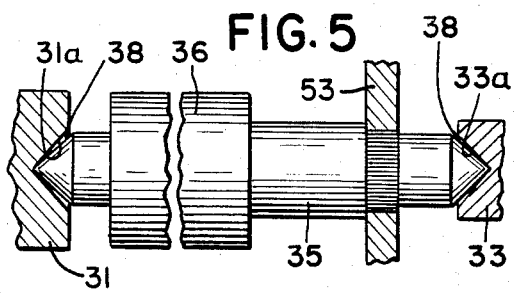
FIG. 5 is an enlarged fragmentary elevation view of one of the supports in the trackball device.

An important aspect of the present invention is that each of the supports 30 does not include a roller bearing which undesirably adds cost. Instead, referring to FIG. 5, each of the supports includes a conical bearing surface 31a in the post 31, a conical journal 38 on each end of the shaft 35 and a conical bearing surface 33a in the free end of the stud 33. The vertex angle of the bearing surfaces 31a and 33a is greater than the vertex angle of the journals 38. For example, the vertex angle of the journals 38 is 87° while the vertex angle of the bearing surfaces 31a and 33a is 90°. As a result, point contact is made between the journal 38 and the bearing surface 31a, and point contact is made between the journal 38 and the bearing surface 33a. Such point contact provides minimal friction, thereby to maximize the ability of the shaft 35 and the sleeves 36 carried thereby to rotate.

It is preferable that the difference in the vertex angles be as small as possible to maintain reliable point contact. In the example above given, the difference is 3°. To insure that the distance between the vertices of the bearing surfaces 31a and 33a precisely matches the distance between the vertices of the journals 38, the stud 33 may be adjusted by rotating the knurled head 34. After the precise distance is attained, the set screw 37 is tightened.

Figure 6:
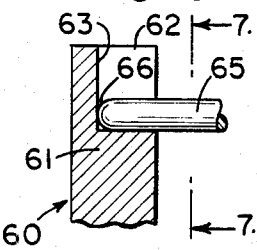
FIG. 6 is a view in vertical section of a pillow block and shaft, incorporating a second embodiment of the present invention.
Figure 7:
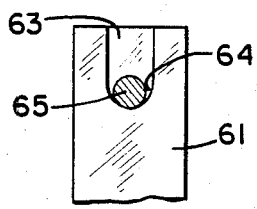
FIG. 7 is a view in vertical section taken along the line 7—7 of FIG. 6.

A second embodiment 60 of the support of the invention is depicted in FIGS. 6 and 7. The support 60 includes a post 61 having been notched at 62 to provide a flat, vertical bearing surface 63 and a part cylindrical cradle or bearing surface 64. The support 60 includes a shaft 65 which carries a sleeve (not shown) in turn supporting the ball 15. At each end of the shaft 65 is a journal 66. The end portion of the shaft 65 shown in FIG. 6 rests on the bearing surface 64 and the rounded journal 66 contacts the bearing surface 63. The two bearing surfaces 63 (one is shown) are spaced apart a distance matching the length of the shaft 65 so as to constrain the shaft between the two. The rounded journal 66 which makes point contact with the flat bearing surface 63 provides minimal friction to the rotating shaft 65. Such point contact will be achieved as long as the radius of curvature of the bearing surface 63 is greater than the radius of curvature of the journal 66. Of course a flat surface has an infinite radius of curvature. By the same token, the radius of curvature of the bearing surface 64 is greater than the radius of the shaft 65 so that line contact occurs between the two to minimize rolling friction.

What has been described, therefore, is an improved trackball device which has minimal roller resistance or friction and does not require the use of roller bearings.

I claim:

1. In a trackball device including a housing having a circular opening therein, a plurality of rotatable supports in the housing, a ball seated on the supports with a portion of the ball projecting through the opening for manual rotation by a user, and means associated with the supports for generating control signals, the improvement being that each support includes a pair of spaced-apart support blocks and a cylindrical shaft, each of said blocks having a part-cylindrical cradle surface completely closed at one end thereof by a flat planar bearing surface, said blocks being disposed so that said cradle surfaces are coaxial and said bearing surfaces are parallel, said shaft being carried by said cradle surfaces, said shaft having part-spherical journals at the ends thereof respectively engaging said bearing surfaces in substantially point contact therewith, the radius of said shaft being substantially less than the radius of curvature of each of said cradle surfaces so as to cause said shaft to make substantially line contact with the associated cradle surfaces.

* * * * *